United States Patent
Lilly

(10) Patent No.: US 11,202,984 B2
(45) Date of Patent: Dec. 21, 2021

(54) DESICCANT DEHUMIDIFIER

(71) Applicant: Stephen Lilly, Bishop Auckland (GB)

(72) Inventor: Stephen Lilly, Bishop Auckland (GB)

(73) Assignee: Ebac Industrial Products Limited

( * ) Notice: Subject to any disclaimer, the term of this patent is extended or adjusted under 35 U.S.C. 154(b) by 311 days.

(21) Appl. No.: 16/544,963

(22) Filed: Aug. 20, 2019

(65) Prior Publication Data

US 2020/0061522 A1   Feb. 27, 2020

(30) Foreign Application Priority Data

Aug. 21, 2018   (GB) .................................. 1813577

(51) Int. Cl.

| | |
|---|---|
| B01D 53/06 | (2006.01) |
| F24F 3/14 | (2006.01) |
| B01D 53/26 | (2006.01) |
| F24F 11/74 | (2018.01) |
| F24F 12/00 | (2006.01) |
| F24F 11/77 | (2018.01) |

(52) U.S. Cl.
CPC ........... *B01D 53/06* (2013.01); *B01D 53/261* (2013.01); *F24F 3/1423* (2013.01); *F24F 11/74* (2018.01); *F24F 11/77* (2018.01); *F24F 12/006* (2013.01); *B01D 2259/4009* (2013.01); *B01D 2259/4508* (2013.01); *F24F 2003/1458* (2013.01)

(58) Field of Classification Search
CPC .................. B01D 53/06; B01D 53/261; B01D 2259/4009; B01D 2259/4508; Y02B 30/56; Y02B 30/70; F24F 3/1423; F24F 11/74; F24F 11/77; F24F 12/006; F24F 2003/144; F24F 2003/1458

USPC .... 96/112, 125, 126, 127, 128, 146; 95/113, 95/114, 115, 117, 123

See application file for complete search history.

(56) References Cited

U.S. PATENT DOCUMENTS

| | | | | |
|---|---|---|---|---|
| 3,042,383 | A | * | 7/1962 | Pennington ............. F24F 1/037 165/7 |
| 4,134,743 | A | * | 1/1979 | Macriss ................. B01D 53/26 95/113 |
| 4,926,618 | A | | 5/1990 | Ratliff |
| 5,860,284 | A | * | 1/1999 | Goland ................. F24F 5/0035 62/94 |
| 6,003,327 | A | | 12/1999 | Belding et al. |
| 6,050,100 | A | * | 4/2000 | Belding ................ B01D 53/06 62/271 |

(Continued)

*Primary Examiner* — Frank M Lawrence, Jr.
*Assistant Examiner* — Frank Lawrence
(74) *Attorney, Agent, or Firm* — Galbreath Law Offices, P.C.; John A. Galbreath

(57) ABSTRACT

The dehumidifier has a rotary bed 6 containing a thermally regenerable desiccant material, including a process segment 7 and a regeneration segment 8, and an air-to-air heat exchanger A having first and second heat-exchange channels A1 and A2. A process air channel 20 conducts process air through the process segment 7 of the rotary bed, through heat-exchange channel A1 of heat exchanger, to outlet 3. A cooling air channel 22 conducts cooling air from an external cooling air inlet 4a, through heat-exchange channel A2 of heat exchanger A to an exhaust air outlet 5a without passing through the rotary bed. The temperature of the return process air is controllable by a variable speed fan 12. A regeneration air channel 26 conducts air via heater box 9 through the regeneration segment 8 of the rotary bed, to exhaust air outlet 5b.

7 Claims, 2 Drawing Sheets

(56) References Cited

U.S. PATENT DOCUMENTS

| | | | | |
|---|---|---|---|---|
| 6,247,323 B1* | 6/2001 | Maeda | ............... | F24F 3/1423 62/271 |
| 2007/0079623 A1* | 4/2007 | Inaba | ................. | F24F 5/0046 62/260 |
| 2013/0036913 A1* | 2/2013 | Fukudome | ........... | F24F 3/1423 96/118 |

* cited by examiner

DESICCANT DEHUMIDIFIER

TECHNICAL FIELD OF THE INVENTION

This invention relates to desiccant dehumidifiers.

BACKGROUND

Dehumidifiers may be used wherever there is a need to lower the ambient humidity level, e.g. to prevent corrosion, mould growth and condensation or maintain a low humidity condition during manufacture, packaging or storage of hygroscopic products. Desiccant dehumidifiers perform exceptionally well when used in cooler climates, or when a low dew-point, deep drying or low humidity levels are required. Since desiccant dehumidifiers do not produce water, they will work effectively down to sub zero temperatures. Although their principle of operation is basic and uncomplicated they are extremely effective and reliable. Air (process air) is drawn into the dehumidifier, where is passes over a wheel impregnated with a thermally regenerable desiccant such as silica gel. As the air passes over a process segment of the wheel, any moisture present in the air is absorbed by the silica gel before leaving the dehumidifier as warm dry air (return air). The silica gel bed is continually, slowly rotating, typically at three revolutions per hour. As the wheel rotates a small portion of the wheel known as the regeneration segment passes through a regeneration phase. During this phase a second air stream (regeneration air) is heated to a high temperature, typically around 110° C. before passing over the wheel. Any moisture present in the wheel is released into this air stream, and this hot wet air is then exhausted outside the space being dried.

This type of dehumidifier has several drawbacks. First, the return air sent back into the space being dried is warmer, partly due to sensible heat picked up from the desiccant bed and also by heat generated when the moisture content of the process air is reduced. The user may therefore need to provide additional cooling to maintain the same room temperature. Second, regeneration of the desiccant bed is achieved by passing a heated airflow over the wheel and this heat is then exhausted outside along with moisture removed from the air. Both of these factors can result in wasted energy and contribute significantly to the running costs.

The prior art shows previous attempts to improve rotary bed dehumidifiers. In U.S. Pat. No. 4,134,743 a heat exchanger is interposed between the dry process air stream and the ambient regeneration air stream so that heat is removed from the process air and used to partially preheat the ambient regeneration air. Although such an arrangement would produce a theoretical improvement in energy efficiency, in practice this would still produce inconsistent room conditions which might still require additional cooling.

U.S. Pat. No. 4,926,618 discloses another rotary bed dehumidifier in which a heat exchanger is interposed between the process air channel downstream of the rotary bed and the regeneration air channel upstream of the rotary bed. A damper is provided for controlling the flow of the regeneration air and a portion of the regeneration air is recirculated and conducted downstream of the damper for at least one additional pass through the heating element and the regeneration segment. A master controller is required to control the air stream flow rates and desiccant bed wheel speed in order to fully regenerate a fixed mass of the desiccant material under any operating condition.

SUMMARY OF THE INVENTION

When viewed from one aspect the present invention proposes a desiccant dehumidifier:
- a rotary bed (6) containing a thermally regenerable desiccant material, including a process segment (7) and a regeneration segment (8);
- an air-to-air heat exchanger A having first and second heat-exchange channels A1 and A2;
- a process air channel (20) arranged to conduct process air from a process air inlet (2), through the process segment (7) of the rotary bed, through heat-exchange channel A1 of heat exchanger A downstream of the rotary bed, to a process air outlet (3);
- a cooling air channel (22) arranged to conduct cooling air from a cooling air inlet (4a), through heat-exchange channel A2 of heat exchanger A to an exhaust air outlet (5a) without passing through the rotary bed;
- flow control means (12) in the cooling air channel;
- a regeneration air channel (26) arranged to conduct air from a regeneration air inlet (4b), through the regeneration segment (8) of the rotary bed, to an exhaust air outlet (5b);

and
heating means (9) in the regeneration air channel (26) upstream of the rotary bed.

In a preferred embodiment the dehumidifier includes a controller (24) arranged to control the flow control means (12) such as to regulate the air outlet temperature of the process air channel (20).

In a preferred embodiment the controller (25) is arranged to increase the air flow through the cooling air channel (22) when the air outlet temperature of the process air channel (20) increases and decrease the air flow when the air outlet temperature falls.

In a preferred embodiment the flow control means includes a variable speed fan (12).

In a preferred embodiment the dehumidifier includes a second air-to-air heat exchanger B having first and second heat-exchange channels B1 and B2, and in which the regeneration air channel (26) is arranged to conduct air through heat-exchange channel B1 of second heat exchanger B upstream of the heating means (9), and through heat-exchange channel B2 of heat exchanger B downstream of the rotary bed (6).

In a preferred embodiment the cooling air channel (22) and the regeneration air channel (26) share a common inlet (4).

In a preferred embodiment the cooling air channel (22) and the regeneration air channel (26) share a common outlet (5).

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
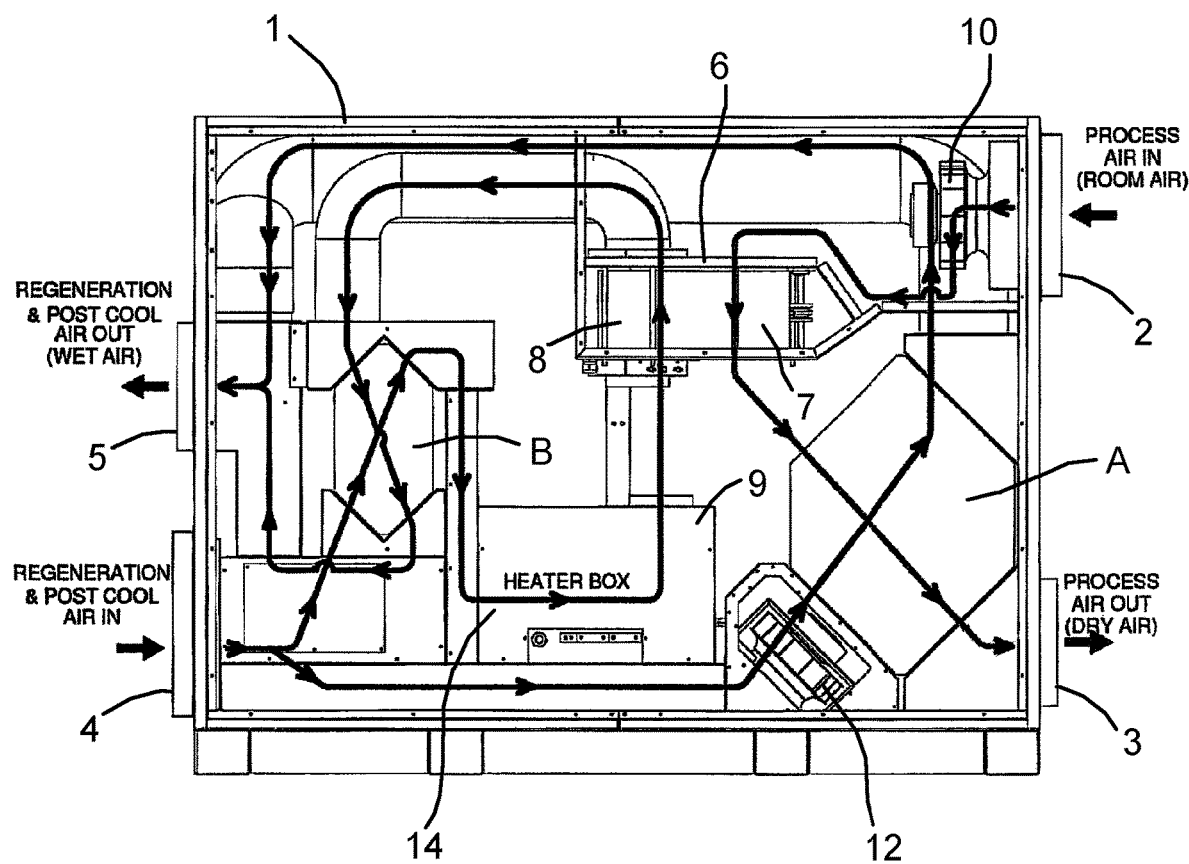
FIG. 1 is a side view of a rotary bed desiccant dehumidifier having a side panel removed to reveal various internal components.

Referring firstly to FIG. 1, the rotary bed desiccant dehumidifier shown in the drawing is intended to remove moisture from an enclosed space, typically a room in a building. The dehumidifier makes use of air drawn from a cooler space such as air from outside the building. For convenience, the enclosed space will be referred to below as "room air" and the cooler space will be referred to as "external air". In the drawing arrows have been superimposed on the dehumidifier to indicate various flow paths.

The desiccant dehumidifier has a housing 1 with a process air inlet 2, a process air outlet 3, a cooling and regeneration air inlet 4, and an exhaust air outlet 5. The process air inlet 2 draws in room air which is dried and returned to the room through the process air outlet 3. External air for desiccant regeneration and air cooling enters through the cooling and regeneration air inlet 4, and wet air is returned to the external space through exhaust air outlet 5.

The housing 1 contains a motor-driven wheel 6 which provides a rotary bed containing a thermally regenerable desiccant material such as silica gel. The rotary bed is geared to rotate slowly, typically at about three revolutions per hour, and includes a process segment 7 in which the desiccant absorbs moisture and a regeneration segment 8 in which the desiccant is heated and dried by means of an electrical heater box 9. A process air fan 10 draws room air through the process air inlet 2 to be dried in the rotary bed of wheel 6. Post-cooling of the room air is provided by a first air-to-air heat exchanger A, typically of the counterflow plate kind, which contains first and second heat-exchange channels A1 and A2 (not labeled). A cooling air fan 12 draws cooling air from the cooling and regeneration air inlet 4 to pass through the first heat exchanger A before being expelled through the exhaust air outlet 5. The speed of the cooling air fan 12 can be electrically controlled to regulate the cooling air flow.

The housing 1 also contains a second air-to-air heat exchanger B, typically of the counterflow plate kind, having first and second heat-exchange channels B1 and B2 (again not labeled). A regeneration air fan 14, included in the heater box assembly 9, draws regeneration air from cooling and regeneration air inlet 4 to be warmed by the heater box 9 before passing through the regeneration segment 8 of the rotary bed 6 and being expelled through exhaust air outlet 5. The second heat exchanger B is interposed in the regeneration air flow, as described below.

Figure 2:
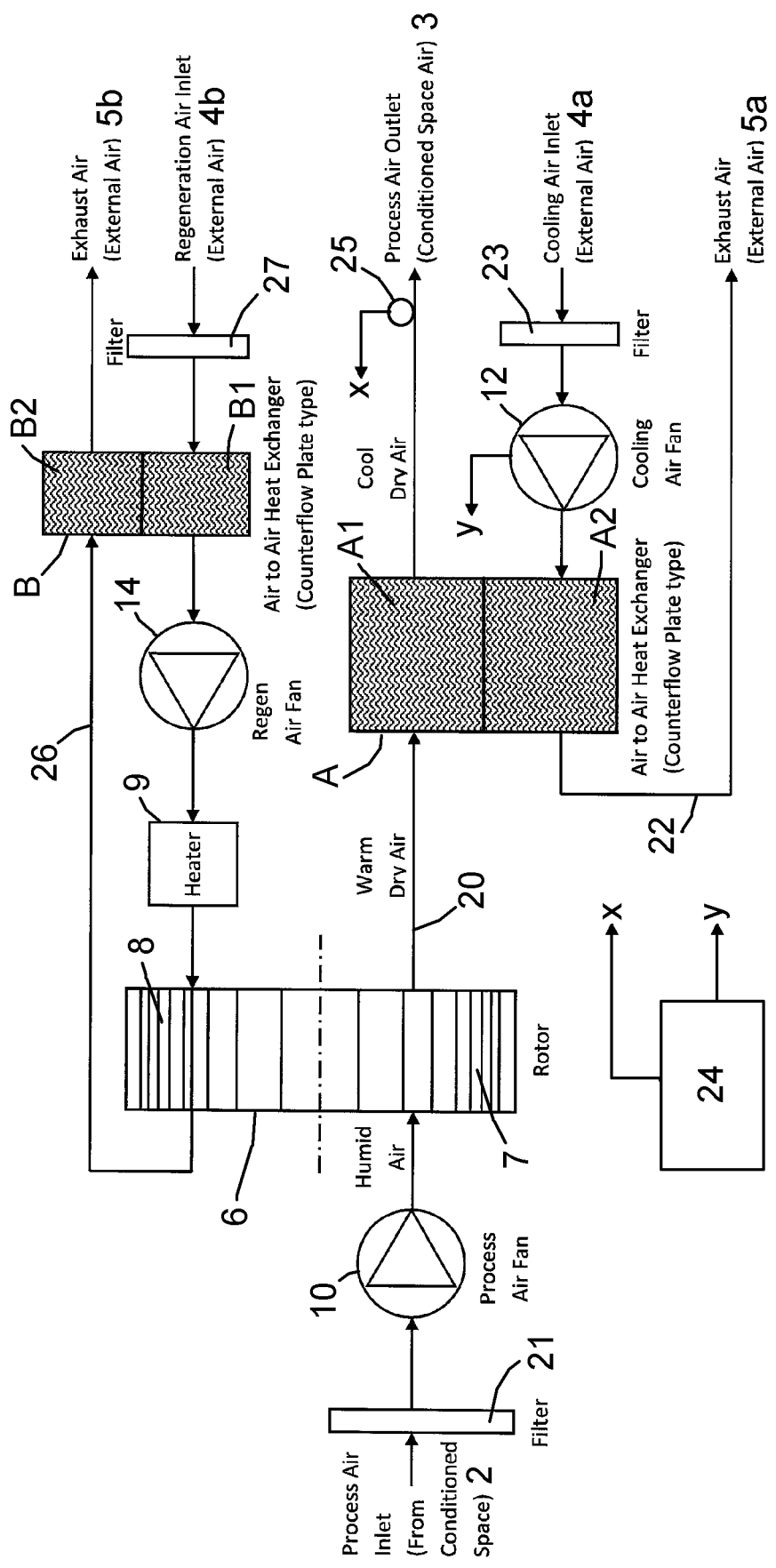
FIG. 2 is a schematic flow diagram of the rotary bed desiccant dehumidifier.

The various air flow paths shown in FIG. 1 can best be understood with reference to FIG. 2. A process air channel 20 conducts process air from process air inlet 2, through the process segment 7 of the rotary bed 6, through heat-exchange channel A1 of heat exchanger A downstream of the rotary bed, to process air outlet 3. During passage through the rotary bed the process air is dried and warmed by interaction with the regenerable desiccant in the process sector 7. An air filter 21 may be provided at the beginning of the process air channel 20. A cooling air channel 22 conducts air from cooling air inlet 4a, through heat-exchange channel A2 of heat exchanger A to exhaust air outlet 5a, without passing through the rotary bed. An air filter 23 may be provided at the beginning of the cooling air channel 22. The cooling air fan 12, which in this embodiment is located upstream of the first heat exchanger A, enables the flow rate through the cooling air channel 22 to be accurately regulated by means of an electronic system controller 24 which can monitor the temperature of air leaving the process air outlet by means of a temperature sensor 25. The controller can therefore regulate the temperature of the air returned to the room, increasing the flow of cooling air to the heat exchanger A when the return air temperature rises and reducing the flow when the return air temperature falls. The regulated cooling which thus takes place within the heat exchanger A ensures that the temperature of the dry air returned to the room is at a comfortable and consistent level. Excess heat removed by the heat exchanger A is expelled into the external air through the exhaust air outlet 5a.

A regeneration air channel 26 containing the regeneration air fan 14 conducts external air from regeneration air inlet 4b, through the regeneration segment 8 of the rotary bed, to exhaust air outlet 5b. The heater box 9 is connected upstream of the rotary bed so that the regeneration air is heated to dry and regenerate the desiccant contained in the rotary bed. Before passing through the heater box 9 the regeneration air passes through heat-exchange channel B1 of second heat exchanger B, upstream of the rotary bed. Downstream of the rotary bed the hot wet air passes through the second heat-exchange channel B2 of the second heat exchanger. The heat exchanger B therefore preheats the air flowing through the regeneration channel using heat recovered from the regeneration air which has passed through rotary bed. As with the other air flow channels, an air filter 27 may be provided at the beginning of the regeneration air channel 26.

Measurements on the present dehumidifier show that it is capable of achieving an excellent temperature reduction on the dry air returned to a room compared with a conventional rotary bed dehumidifier. Furthermore, the present dehumidifier achieves a measurable and significant energy saving over rotary bed dehumidifiers without heat exchangers.

It will be appreciated that although the a variable speed fan 12 provides a simple and inexpensive way to control the air flow through the cooling air channel this could be achieved by other means such as a variable flow restrictor.

Although for installation purposes it is usually more convenient to use common air inlet and exhaust outlet connections 4, 5 for the cooling air channel 22 and the regeneration air channel 26 as in FIG. 1, these channels could be provided with separate inlets and outlets 4a, 5a and 4b, 5b as in FIG. 2.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A desiccant dehumidifier:
   a rotary bed (6) containing a thermally regenerable desiccant material, including a process segment (7) and a regeneration segment (8);
   an air-to-air heat exchanger A having first and second heat-exchange channels A1 and A2;
   a process air channel (20) arranged to conduct process air from a process air inlet (2), through the process segment (7) of the rotary bed, through heat-exchange channel A1 of heat exchanger A downstream of the rotary bed, to a process air outlet (3);
   a cooling air channel (22) arranged to conduct cooling air from a cooling air inlet (4a), through heat-exchange channel A2 of heat exchanger A to an exhaust air outlet (5a) without passing through the rotary bed;
   flow control means (12) in the cooling air channel;
   a regeneration air channel (26) arranged to conduct air from a regeneration air inlet (4b), through the regeneration segment (8) of the rotary bed, to an exhaust air outlet (5b); and
   heating means (9) in the regeneration air channel (26) upstream of the rotary bed.

2. A desiccant dehumidifier according to claim 1 which includes a controller (24) arranged to control the flow control means (12) such as to regulate the air outlet temperature of the process air channel (20).

3. A desiccant dehumidifier according to claim 2 in which the controller (24) is arranged to increase the air flow through the cooling air channel (22) when the air outlet temperature of the process air channel (20) increases and decrease the air flow when the air outlet temperature falls.

4. A desiccant dehumidifier according to claim 1 in which the flow control means includes a variable speed fan (12).

5. A desiccant dehumidifier according to claim 1 which includes a second air-to-air heat exchanger B having first and second heat-exchange channels B1 and B2, and in which the regeneration air channel (26) is arranged to conduct air through heat-exchange channel B1 of second heat exchanger B upstream of the heating means (9), and through heat-exchange channel B2 of heat exchanger B downstream of the rotary bed (6).

6. A desiccant dehumidifier according to claim 1 in which the cooling air channel (22) and the regeneration air channel (26) share a common inlet (4).

7. A desiccant dehumidifier according to claim 1 in which the cooling air channel (22) and the regeneration air channel (26) share a common outlet (5).

\* \* \* \* \*